US012571140B2

(12) United States Patent
Tiisvelt

(10) Patent No.: US 12,571,140 B2
(45) Date of Patent: Mar. 10, 2026

(54) METHOD OF PRODUCING RIGID PACKAGE MATERIAL AND RIGID BOX FROM TEXTILE WASTE

(71) Applicant: KIUD TECHNOLOGIES OÜ, Tartu (EE)

(72) Inventor: Liis Tiisvelt, Tartu (EE)

(73) Assignee: KIUD TECHNOLOGIES OÜ, Tartu (EE)

( * ) Notice: Subject to any disclaimer, the term of this patent is extended or adjusted under 35 U.S.C. 154(b) by 0 days.

(21) Appl. No.: 18/960,164

(22) Filed: Nov. 26, 2024

(65) Prior Publication Data

US 2025/0171939 A1 May 29, 2025

(30) Foreign Application Priority Data

Nov. 29, 2023 (EP) .................................... 23213001

(51) Int. Cl.

| | |
|---|---|
| ***B31B 50/00*** | (2017.01) |
| ***B31B 50/26*** | (2017.01) |
| ***B31B 50/74*** | (2017.01) |
| ***B65D 1/22*** | (2006.01) |
| ***D04H 1/425*** | (2012.01) |
| ***D04H 1/435*** | (2012.01) |
| ***D04H 1/4382*** | (2012.01) |
| ***D04H 1/488*** | (2012.01) |
| ***D04H 1/732*** | (2012.01) |

(52) U.S. Cl.

CPC ......... *D04H 1/43835* (2020.05); *B31B 50/26* (2017.08); *B31B 50/747* (2017.08); *B65D 1/22* (2013.01); *D04H 1/425* (2013.01); *D04H 1/435* (2013.01); *D04H 1/488* (2013.01); *D04H 1/732* (2013.01); *D10B 2201/02* (2013.01); *D10B 2505/10* (2013.01)

(58) Field of Classification Search

CPC .... D04H 1/43835; D04H 1/425; D04H 1/435; D04H 1/488; D04H 1/732; B31B 50/747; B31B 50/26; B65D 1/22

USPC .... 493/56; 28/103, 100, 102, 104, 107, 108; 442/327, 414, 402, 136, 164, 334

See application file for complete search history.

(56) References Cited

U.S. PATENT DOCUMENTS

| | | | | |
|---|---|---|---|---|
| 4,416,936 A * | 11/1983 | Erickson | D04H 1/4374 28/240 |
| 2016/0215421 A1* | 7/2016 | Samsøe | B29C 70/46 |
| 2023/0249889 A1* | 8/2023 | Törnblom | D04H 1/542 220/592.25 |

FOREIGN PATENT DOCUMENTS

| | | |
|---|---|---|
| WO | 2015/044894 A1 | 4/2015 |
| WO | 2022/009130 A1 | 1/2022 |

* cited by examiner

*Primary Examiner* — Jacob A Smith

(74) *Attorney, Agent, or Firm* — Lando & Anastasi, LLP

(57) ABSTRACT

Disclosed is a method of producing a rigid package material from textile waste. The method comprises mechanically shredding the textile waste into fibres, the textile waste comprising synthetic textile; blending the fibres with a binder; arranging the blended fibres into a nonwoven web; needle punching the nonwoven web to form a nonwoven felt; and pressing the nonwoven felt thermomechanically to obtain the rigid package material.

10 Claims, 4 Drawing Sheets

METHOD OF PRODUCING RIGID PACKAGE MATERIAL AND RIGID BOX FROM TEXTILE WASTE

CROSS-RELATED APPLICATION

This application is a U.S. National Stage Application of International Application No. EP23213001.3, filed Nov. 29, 2023; the entire contents of the foregoing application is hereby incorporated by reference.

TECHNICAL FIELD

The present disclosure relates to methods of producing rigid package materials from textile waste. Moreover, the present disclosure relates to methods of producing rigid boxes. Furthermore, the present disclosure relates to rigid package materials.

BACKGROUND

The textile industry, notorious for its significant environmental impact, generates millions of tons of waste annually. Among the various sources of textile waste, discarded clothes and home textiles from consumers constitute a large amount of the total waste. Unfortunately, the majority of the textile waste, consisting of mixed fibre compositions, poses a challenge for effective recycling due to difficulties in separation. Moreover, current practices of incineration and landfilling also contribute to environmental pollution.

The existing problem extends beyond environmental concerns to the growing demand for sustainable packaging materials. Traditional methods of excessive packaging, especially in the context of the rising trend in e-commerce, are unsustainable. The e-commerce, generating 70%-84% higher environmental impacts compared to physical retail shopping, is a significant contributor to urban solid waste. The environmental impact of packaging materials, predominantly made of cellulose or plastic-based materials, is substantial.

The technical problem at hand is the transformation of mixed post-consumer textile waste fibres into a packaging material that combines rigidity with lightweight properties. The challenge lies in creating a solution that is both technically scalable and economically viable for new applications, incorporating a significant amount of such mixed post-consumer waste streams.

Traditional cardboard boxes, long employed as standard packaging, present significant environmental drawbacks. Their production involves deforestation, habitat loss, extensive water and energy consumption, and chemical use, leading to pollution and greenhouse gas emissions. Despite attempts to promote sustainability through recycling, only a half of discarded cardboard contributes to new cardboard production in the developed world. Moreover, cardboard's single-use nature limits its reuse potential, rendering it less environmentally friendly.

Therefore, in light of the foregoing discussion, there exists a need to overcome the aforementioned drawbacks.

SUMMARY

The aim of the present disclosure is to provide a method of producing a rigid nonwoven material from textile waste, to withstand elevated weight compared to conventional corrugated cardboard of the similar thickness. The aim of the present disclosure is achieved by a method of producing a rigid package material from textile waste and a method of producing foldable rigid boxes and/or other rigid boxes and a rigid package material as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
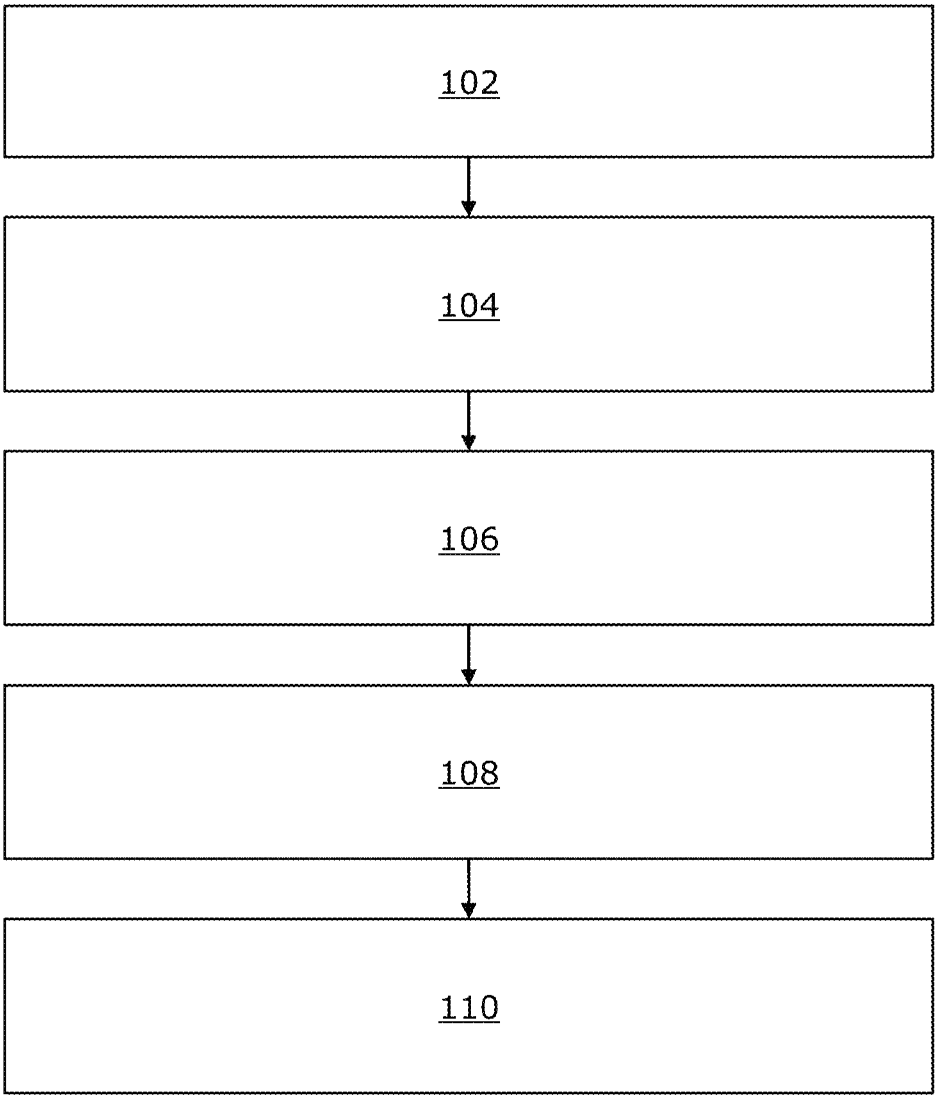
FIG. 1 is an illustration of a flowchart depicting steps of a method of producing a rigid package material from textile waste, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a method of producing a rigid package material from textile waste, the method comprising:

- mechanically shredding the textile waste into fibres having length from 0.2-90 mm, the textile waste comprising at least 25% of synthetic textile fibers;
- blending the fibres with a binder having a melting point 90-250° C.; wherein the blended fibres comprise 50-95% of the shredded textile waste fibres and 5-50% of the binder;
- arranging the blended fibres into a nonwoven web having thickness of 5-50 mm;
- needle punching the nonwoven web to form a nonwoven felt with a density of 300-5000 g/m$^2$ and thickness of 5-40 mm; and
- pressing the nonwoven felt thermomechanically at a pressure of 100-300 bars to obtain the rigid package material having thickness of 0.8-10 mm, wherein the pressing is carried out at a temperature of 90-250 C, during time period of 40-300 seconds.

The first aspect of the present disclosure provides a method that is used to minimize or repurpose the textile waste, maximize strength, and ensure dimensional consistency, making the method suitable for sustainable and efficient rigid package material production. In this regard, the method ensures optimal binding and strength by mechanically shredding the textile waste into the fibres and blending the fibres with the binder within the specific temperature range. The arrangement of the blended fibres into the nonwoven web, followed by the needle punching, but it is appreciated that the method is not limited to the needle-punching method, and the thermomechanical pressing, creates the nonwoven felt characterized by the precise density and thickness. The aforementioned steps synergistically work together to produce the rigid package material with the thickness of 0.8-10 mm. This specific thickness enables to produce rigid durable packages from the rigid package material. With a smaller thickness, the package would be too flexible and would not keep its form. With a higher thickness, it would be difficult to form a specific package, like box etc. The mechanical shredding ensures efficient fiber size reduction, and the blending with the binder provides structural integrity. Moreover, the needle punching enhances density and the thickness uniformity, while thermomechanical pressing imparts rigidity. Optionally, the rigid package material obtained via the present method has maximum compressive strength in a range of 250-800 $N/m^2$ and extension at maximum compressive load in a range of 2-7 mm. The rigid package material with these parameters is easy to process and enables creation of various durable rigid packaging models, such as per FEFCO codes, including various rigid boxes, but not limited to it.

In a second aspect, the present disclosure provides a method of producing a rigid box comprising

- die-cutting, laser-cutting or plotting the rigid package material of aforementioned aspect to obtain a layout of the rigid box, wherein the cut is made half-through the rigid package material; and
- folding or constructing the layout of the rigid package material to obtain the rigid box.

The second aspect of the present disclosure provides a method of producing the rigid box from the previously obtained rigid package material, thus introducing efficiency and material optimization. The die-cutting process and laser-cutting, with a cut made half-through the rigid package material, allows for precise layout creation comprising folding lines for folding the rigid box. The specific overall layout of the rigid box is cut through, however, for creating the folding lines, the material is cut half through. The layout, when folded, results in the rigid box. The synergy between die-cutting and folding minimizes material usage, as the cut is strategically designed to facilitate a seamless folding process. The method ensures that the rigid box maintains structural integrity while minimizing material waste, providing a sustainable solution for packaging applications. The die-cutting and folding stages work synergistically to create a functional and eco-friendly rigid box from the previously engineered rigid package material.

In a third aspect, the present disclosure provides a rigid package material comprising 50-95% of textile waste fibres of a nonwoven web obtained but not limited to a needle-punching method, the textile waste fibres comprising at least 25% of synthetic fibres having a length in a range of 0.2-90 mm, and 5-50% of a binder having a melting point 90-250° C., and wherein the rigid package material has a thickness of 0.8-10 mm.

The third aspect of the present disclosure provides a rigid package material with a specific composition—60-70% textile waste fibres, including a significant proportion of synthetic fibres, and 30-40% of a binder within the defined melting point range. Said combination offers advantages in both sustainability and functionality. The high percentage of textile waste fibres ensures eco-friendly material sourcing, while the binder contributes to structural integrity within the specified temperature range. The synergy lies in achieving a balance between recycled content and the chemical composition and properties of the binder. This results in a rigid package material that is not only environmentally conscious but also structurally robust and easy to handle during processing, making it suitable for a wide range of packaging applications. The combination of the textile waste fibres and the binder content harmonizes to deliver the rigid package material that fulfils both ecological and functional requirements in packaging.

The term "rigid packaging material" as used herein refers to a specialized material designed for packaging applications that possess a combination of stiffness, durability, reusability, and the thickness. It will be appreciated that the rigid packaging material is versatile and could be used to produce rigid boxes for packaging various consumer goods and other goods (not limited to consumer goods).

The term "textile waste" as used herein refers to discarded or unwanted materials originating from the textile industry, particularly from the production and consumption of textiles. Beneficially, the utilization of the textile waste for producing the rigid packaging material addresses environmental concerns by repurposing discarded textiles, contributing to sustainable practices and reducing the overall environmental impact associated with textile waste disposal.

Optionally, the textile waste further comprises natural textile. The term "natural textiles" as used herein refers to fibres that are derived from plants, animals, or minerals and include materials such as cotton, wool, flax, jute, leather and silk. Typically, the natural textiles are known for their unique properties, such as comfort, breathability, and sustainability. The term "cotton" as used herein refers to a natural fiber obtained from the cotton plant, known for its softness, breathability, and moisture-absorbing properties. The term "wool" as used herein refers to a natural fiber derived from the fleece of sheep, known for its insulating properties, resilience, and moisture-wicking capabilities. The term "flax" as used herein refers to a natural fiber obtained from the flax plant, known for its strength, durability, and breathable nature. The addition of the natural textiles enhances the raw material diversity, introducing variations in fiber properties. The incorporation of the natural textile in the textile waste enhances the diversity of the raw materials. Said addition introduces variations in the fiber properties, potentially influencing the structural and textural characteristics of the rigid package material. The combination of the synthetic and the natural textiles may contribute to improved strength, aesthetic appeal, or other desirable features in the rigid package material. The technical effect lies in the synergistic interaction between the synthetic and the natural textiles, leading to a more versatile and potentially enhanced rigid package material. Furthermore, the textile waste normally comprises various textile fiberts with different chemical composition for which it is normally difficult to find a new purpose due to lack of economically efficient sorting methods by the fiber composition type. In the prior art, it is preferred, that different textile fibers are separated before further treatment upon a specific new product. The present disclosure enables to use mix of different textile fibers without the need for separating them by the specific composition type.

The term "mechanical shredding" as used herein refers to a process of breaking down the textile waste into fibres. In this regard, the method comprises mechanically shredding the textile waste into the fibres having length from anywhere in the range of 0.2-90 mm. Optionally, the fiber length lies in a range of 0.2 mm to 8 mm including 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.1 mm, 5.2 mm, 5.3 mm, 5.4 mm, 5.5 mm, 5.6 mm, 5.7 mm, 5.8 mm, 5.9 mm, 6.0 mm, 6.1 mm, 6.2 mm, 6.3 mm, 6.4 mm, 6.5 mm, 6.6 mm, 6.7 mm, 6.8 mm, 6.9 mm, 7.0 mm, 7.1 mm, 7.2 mm, 7.3 mm, 7.4 mm, 7.5 mm, 7.6 mm, 7.7 mm, 7.8 mm, 7.9 mm, 8.0 mm. Optionally, when the textile waste is an post-industrial waste then the length of the fibres could be in a range of 5 mm to 90 mm. In an embodiment, the length of the fibres from 5 mm up to 90 mm is preferred, as the rigid package material obtained via the present method has a more uniformed structure, surface smoothness, durability and easier handling during the die-cutting, laser-cutting and plotting process. Optionally, when the textile waste is a mixed waste then the length of the fibres could be in a range of 0.2 mm to 50 mm. The mixed waste may comprise for example polyester-cotton blend (also known as polycotton), acrylic-cotton blend, cotton-elastane blend, cotton-polyamide blend, viscose-cotton blend, polyester-nylon blend, etc. The textile waste comprises at least 25% of synthetic textile. Optionally, the textile waste comprises 25%, 30%, 35%, 40%, 45%, 50%, 55%, 60%, 65%, 70%, 75%, 80%, 85%, 90%, 95%, or 100% of the synthetic textile fibers. The synthetic textile fibers may be selected from polyester, acrylic, elastane, polyamide, viscose, polyester-nylon, nylon, spandex, rayon, olefin, polypropylene, cellulose acetate or polycarbonate.

The term "binder" as used herein refers to a substance or component that is used to hold together or bind other materials. Notably, the binder plays a crucial role in providing cohesion, strength, and stability to the composite material matrix. Optionally, the binder is selected from at least one of: Polyethyene (PE), a post-industrial or post-consumer recycled Polyethylene (PCRPE), a post-industrial or post-consumer recycled Polypropylene (PCRPP), recycled Polyethyleneterephtalate (rPET) or any other substance or textile fiber type that has low melting point, known as low-melt fibers. The term "post-consumer recycled Polyethylene (PCRPE)" as used herein refers to polyethylene derived from plastic products that have been used by consumers, collected after use, and then processed and recycled to create new material. The term "post-consumer recycled Polypropylene (PCRPP)" as used herein refers to polypropylene obtained from plastic items that consumers have used, discarded, and then undergone a recycling process. The recycled Polyethyleneterephtalate (rPET) as used herein refers to polyethyleneterephtalate obtained from recycled polyethyleneterephtalate bottles. In this regard, the method involves the selection of the binder from at least one of specific recycled materials: the PCRPE, the PCRPP, rPET. The technical effect lies in the sustainable and responsible choice of the binders. By utilizing any kind of recycled polyethylene or recycled polypropylene, the method reduces the demand for virgin plastics, lessens the environmental impact associated with the production of new materials, and addresses concerns related to plastic waste accumulation. The resulting rigid package material reflects a commitment to circular and eco-conscious manufacturing practices.

The term "blending" as used herein refers to a process of mixing the shredded fibres with the binder having a melting point between 90° C.-250° C. Optionally, the melting point lies in a range of 90° C., 100° C., 110° C., 120° C., 130° C., 140° C., 150° C., 160° C., 170° C., 180° C., 190° C. 200° C., 210° C., 220° C., 230° C., 240° C. or 250° C. In this regard, the blending of shredded fibres with the binder ensures cohesion and stability in the resulting material. The binder, with the aforementioned melting point, contributes to the thermomechanical processing later. The blending step is crucial for achieving the desired rigidity and formability in the final product. The melting point between 90° C.-250° C. is important for later treatment steps. The binder must bare specific temperature range to endure specific conditions. If the binder melting point would be too high, the outcoming rigid package material would be too plastic. If the melting point would be too low, the specific characteristics for the rigid package material would not be achieved.

The term "nonwoven web" as used herein refers to a fabric-like sheet or a mat composed of fibres that are arranged without a predefined weaving or knitting pattern. In an example, the nonwoven web is a layered structure created from the blended fibres and resembling a web or a mat. In this regard, the method comprises arranging or structuring the blended fibres into the nonwoven web or a mat with the thickness of 5-50 mm. Optionally, the thickness lies in a range of 5 mm, 5.5 mm, 6.0 mm, 6.5 mm, 7.0 mm, 7.5 mm, 9.0 mm, 10.5 mm, 12.0 mm, 12.5 mm, 14.0 mm, 15.5 mm, 20.0 mm or 25.5 mm up to 5.5 mm, 6.0 mm, 6.5 mm, 7.0 mm, 7.5 mm, 9.0 mm, 10.5 mm, 12.0 mm, 12.5 mm, 14.0 mm, 15.5 mm, 20.0 mm, 25.5 mm or 30.0 mm. The technical effect of said arranging is to create a foundation for the subsequent needle punching process, but not limited to needle-punching process, by establishing the coherent structure.

Optionally, arranging the blended fibres into the nonwoven web comprises at least one method selected from airlaying or carding. The term "airlaying" as used herein refers to a fabric-like material manufacturing process where fibres are entangled with air currents, creating a soft, absorbent, and breathable structure. The airlaying involves dispersing fibers with air and distributing the fibres randomly to form the nonwoven web, and bonding the fibers together using heat and binder. The term "carding" as used herein refers to a process in which fibres are aligned, and formed into a thin web. The carding is performed using a carding machine equipped with wire brushes or rollers to comb and align the fibres, ensuring a more organized arrangement compared to the airlaying.

The selection between the airlaying and the carding in arranging the blended fibres into the nonwoven web influences the structural characteristics of the final material. The airlaying, with its random fiber distribution, may enhance the rigid package material's resilience and flexibility. The carding, with its aligned and organized fibres, could contribute to a more uniform and structured nonwoven web matrix, potentially affecting properties like strength and texture. The technical effect lies in tailoring the arrangement of fibres to achieve specific material characteristics, addressing the requirements for the subsequent steps in the method and the desired properties of the rigid package material.

Optionally, the blended fibres comprise 50-95% of the shredded textile waste fibres and 5-50% of the binder. The broadest range of percentages of the shredded textile waste fibres lies from 50-95%. Optionally, the percentage of the shredded textile waste fibres lies in a range of 60.0%, 61.5%, 62.0%, 62.5%, 63.0%, 63.5%, 64.0%, 64.5%, 65.0%, 65.5%, 66.0%, 66.5%, 67.0% or 67.5%, 68.0%, 68.5% or 69.0% up to 61.5%, 62.0%, 62.5%, 63.0%, 63.5%, 64.0%, 64.5%, 65.0%, 65.5%, 66.0%, 66.5%, 67.0% or 67.5%, 68.0%, 68.5% or 69.0% or 70%. The broadest percentage of the binder lies in a range of 5-50%. Optionally, the percentage of the binder lies in a range of 40.0%, 38.5%, 38.0%, 37.5%, 37.0%, 36.5%, 36.0%, 35.5%, 35.0%, 34.5%, 34.0%, 33.5%, 33.0% or 32.5%, 32.0%, 31.5% or 31.0% up to 38.5%, 38.0%, 37.5%, 37.0%, 36.5%, 36.0%, 35.5%, 35.0%, 34.5%, 34.0%, 33.5%, 33.0% or 32.5%, 32.0%, 31.5%, 31.0% or 30%.

In this regard, the method allows for flexibility in the ratio of the shredded textile waste fibres to the binder. This flexibility enables adaptation based on specific requirements, considering factors such as the desired properties of the rigid package material, cost considerations, or availability of the rigid package materials. The technical effect of the aforementioned range lies in the ability to fine-tune the rigid package material composition for the specific application.

In an example, a higher percentage of the shredded textile waste fibres (closer to 80%) might enhance the sustainability aspect of the rigid package material, utilizing more recycled content. Conversely, a lower percentage (closer to 50%) might be chosen for specific performance characteristics or cost-effectiveness.

In another example, the optional range between 50% to 80% allows for various compositions, including: 60% shredded textile waste fibres and 40% binder; 65% shredded textile waste fibres and 35% binder; 70% shredded textile waste fibres and 30% binder. It will be appreciated that said intervals provide a spectrum of composition possibilities within the broader range, offering versatility in tailoring the rigid package material to meet specific criteria or preferences.

Optionally, the required rigidity and the thickness of the rigid package material is achieved when using at least 60% percent of post-consumer or post-industrial recycled cotton/polyester mixed fibres. Optionally, the binder is impregnated, coated or laminated with a suitable oil, wax, resin or TPU film to give colour as the obtained rigid package material and/or enhancing the surface printing quality.

The term "needle punching" as used herein refers to a process that transforms the nonwoven web into a nonwoven felt. Generally, the needle punching is achieved by using specialized needles to mechanically interlace and compact the blended fibres within the nonwoven web. The term "nonwoven felt" as used herein refers to a fabric-like material composed of fibres that are mechanically interlocked through the needle punching. Typically, the nonwoven felts are created by entangling fibres rather than weaving or knitting, resulting in a cohesive and durable textile. The method comprises needle punching the nonwoven web to form the nonwoven felt with the areal density in a range of 300 $g/m^2$ to 5000 $g/m^2$ and thickness of 5-40 mm. In this regard, during the needle punching, the nonwoven web is subjected to repeated penetrations by the needles. The needles entangle the fibres, mechanically interlocking them and compacting the fibres. This action creates the nonwoven felt characterized by increased areal density, which contributes to the rigid package material's strength and durability.

Optionally, the areal density lies in a range of 300 $g/m^2$, 1000 $g/m^2$, 1500 $g/m^2$, 2000 $g/m^2$, or 2500 $g/m^2$ up to or 1000 $g/m^2$, 1500 $g/m^2$, 2000 $g/m^2$, or 3000 $g/m^2$. Optionally, the thickness of the nonwoven felt is in a range of 5 mm, 5.5 mm, 6.0 mm, 6.5 mm, 7.0 mm, 7.5 mm, 9.0 mm, 10.5 mm, 12.0 mm, 12.5 mm, 14.0 mm, or 15.5 mm up to 5.5 mm, 6.0 mm, 6.5 mm, 7.0 mm, 7.5 mm, 9.0 mm, 10.5 mm, 12.0 mm, 12.5 mm, 14.0 mm, 15.5 mm or 20.0 mm. Beneficially, said density is crucial for achieving the desired rigidity and strength in the rigid package material. Advantageously, the needle punching ensures uniformity in the thickness of the nonwoven felt, maintaining it within the defined range of 5-40 mm. This control over the thickness contributes to the consistency and reliability of the rigid package material.

The term "pressing" as used herein refers to a manufacturing process in which the nonwoven felt, created from the mechanically shredded and blended textile waste, undergoes a thermomechanical treatment. The thermomechanical treatment involves subjecting the nonwoven felt to a combination of heat and mechanical pressure over a certain period of time. The method comprises processing the nonwoven felt thermomechanically at a pressure of 100-300 bars to obtain the rigid package material having thickness of 0.8-10 mm. Optionally, the pressure is in a range of 100 bars, 105 bars, 110 bars, 115 bars, 120 bars, 125 bars, 130 bars, 135 bars, 140 bars, 160 bars, 180 bars, 200 bars, 225 bars or 240 bars up to 105 bars, 110 bars, 115 bars, 120 bars, 125 bars, 130 bars, 135 bars, 140 bars, 160 bars, 180 bars, 200 bars, 225 bars, 240 bars or 250 bars, 255 bars, 260 bars, 265 bars, 270 bars, 275 bars, 280 bars, 285 bars, 295 bars or 300 bars. It is possible to use such high pressures for thermomechanical pressing of the nonwoven felt because of the previously used textile waste composition, specifically selected binder and thickness of the nonwoven web. The previous steps enable to produce the nonwoven web, which endures the thermomechanical pressing at such conditions.

The thermomechanical pressing ensures that the rigid package material attains a specific thickness, falling within the defined range of 0.8-10 mm. Optionally, the thickness of the rigid package material is in a range of 1.00 mm, 1.20 mm, 1.50 mm, 1.75 mm, 2.00 mm, 2.50 mm or 2.75 mm up to 1.20 mm, 1.50 mm, 1.75 mm, 2.00 mm, 2.50 mm, 2.75 mm or 3.00 mm. This control is crucial for meeting the dimensional requirements of the final product.

Moreover, the combination of heat and pressure in the thermomechanical process imparts a higher level of rigidity to the rigid package material. This is instrumental in achieving the desired stiffness and strength in the rigid package material.

Optionally, the pressing is carried out at a temperature of 90-250° C., during time period of 40-300 seconds. Optionally, the pressing is carried out at the temperature in a range of 120° C., 122° C., 125° C., 130° C., 135° C., 140° C., 145° C. or 150° C. The aforementioned temperature range ensures that the pressing process is conducted within a controlled thermal environment. This helps in maintaining the integrity of the rigid package material, preventing undesired degradation or other thermal-related issues. Furthermore, with such temperature range, it is possible to obtain rigid package material having specific thickness and rigidity. Optionally, the pressing is carried out during time period in a range of 40 sec, 45 sec, 50 sec, 55 sec, 60 sec, 65 sec, 70 sec, 75 sec, 80 sec, 85 sec, 90 sec, 95 sec, 100 sec, 105 sec, 115 sec, 120 sec, 125 sec, 130 sec or 135 sec up to 45 sec, 50 sec, 55 sec, 60 sec, 65 sec, 70 sec, 75 sec, 80 sec, 85 sec, 90 sec, 95 sec, 100 sec, 105 sec, 115 sec, 120 sec, 125 sec, 130 sec, 135 sec, up to 300 sec. The optional time period of 40-300 seconds provides flexibility for process optimization. Optionally, depending on the specific requirements and characteristics of the textile waste, the previously mentioned range allows for fine-tuning the duration of the pressing process to achieve the desired properties of the rigid package material.

Moreover, during the thermomechanical process, the nonwoven felt is pressed flat between the two heated plates or rollers. The pressing line consists of a machinery with two or more heated plates or rollers that are covered with Teflon sheets, but not limited to Teflon. For example other examples include Mylar plastic sheets or something entirely new, to avoid the heated mat sticking on the hot plates. Additionally, the last step includes automated feeders, which load and unload the mat between the heated plates or rollers, where it's pressed with 100-300 bars during 40-300 seconds. The outcoming rigid package material is a thin and rigid sheet with the thickness of 0.8-10 mm and has an enhanced tear and tensile strength. Conventionally used double-belt press systems used in textile industry would not enable to achieve the rigid package material with previously mentioned properties.

Optionally, the nonwoven felt or map can be laminated with a thin layer of film or a foil, which can be applied on top and/or below of the material during the pressing process. The term "laminated" as used herein refers to a Thermoplastic Polyurethane film or any other film with different chemical composition.

Optionally, the rigid package material is further processed with oil wax. Herein, the oil wax refers to a substance that is derived from a combination of oil and wax components. In this regard, the oil wax is applied to the surface of the rigid package material using an appropriate method, ensuring an even and controlled coating. This may involve techniques such as spraying, brushing, or dipping, depending on the specific requirements of the application. Optionally, the application of the oil wax serves multiple purposes. Optionally, the oil wax not only imparts a distinctive finish, enhancing the visual aesthetics of the rigid package material but also provides a protective layer. The protective layer could contribute to increased durability, weather resistance, and resistance to external factors such as moisture or abrasion.

The term "rigid box" as used herein refers to a three-dimensional, sturdy, and durable packaging structure created from the rigid package material obtained through the aforementioned steps. The rigid box is designed to provide structural integrity and protection to the contents it houses. The term "layout" as used herein refers to a pre-die-cut or laser-cut or plotted configuration of the rigid package material, which is the precursor to the rigid box. The layout outlines the shape and structure of the rigid box before the die-cutting process.

The term "die cutting" as used herein refers to a manufacturing process that involves the use of a specialized tool, known as a die, to cut or shape materials, typically paper, cardboard, fabric, or metal, into precise and predetermined shapes. The die is a sharp-edged, custom-shaped blade or mold, often made of metal, which is pressed into the material to create specific patterns or forms. The method comprises die-cutting the rigid package material to obtain the layout of the rigid box, wherein the cut is made half-through the rigid package material to create folding lines. In this regard, the die-cut is made half-through the rigid package material, meaning it penetrates only halfway into the rigid package material's thickness and thereby folding lines for folding the rigid box are created. The half-through cut allows for easier folding and assembly of the rigid box while maintaining the structural integrity of the rigid package material. The die-cutting machine is adjusted to create a cut that does not extend through the entire thickness of the rigid package material. Optionally, a specific overall layout can be obtained by cutting through the rigid package material before making half-through cut for folding lines.

The method comprises folding the layout of the rigid package material to obtain the rigid box. In this regard, the folding transforms the two-dimensional layout into a volumetric structure, creating the rigid box. The pre-cut portions of the rigid package material guide the folding process, ensuring precise alignment of the rigid box components. The method ensures that the rigid box maintains its robustness while being efficiently produced from the rigid package material.

Additionally, once the nonwoven felt is cooled down from the pressing procedure, it is prepared for the die-cutting. Cutting the nonwoven felt can be performed with the guillotine, vertical bandsaw, sliding panel or table saw, cabinet saw or a laser cutter. The ready-cut nonwoven felt are proceeded to the flexo-printing, where the logo or other design is applied with a water-based ink. Then the printed nonwoven felt are placed to the die-cut form and the layout of the foldable packaging (box) is punched out via die. Optionally, the rigid packaged material can be perforated, embossed and debossed.

The present disclosure also relates to the rigid package material as described above. Various embodiments and variants disclosed above, with respect to the aforementioned method of producing a rigid package material from textile waste and the aforementioned method of producing a rigid box, apply mutatis mutandis to the rigid package material.

The rigid package material is characterized by specific composition ratios. The rigid package material consists of 50-95% textile waste fibres, with at least 25% of these fibres being synthetic. Additionally, the composition includes 5-50% of the binder with a melting point ranging from 90-250° C. Optionally, the melting point is in a range of 90° C., 100° C., 110° C., 120° C., 122° C., 125° C., 130° C., 135° C., 140° C., 145° C., 150° C., 160° C., 170° C., 180° C., or 190° C. up to 122° C., 125° C., 130° C., 135° C., 140° C., 145° C., 150° C., 160° C., 170° C., 180° C., 190° C., or 200° C., up to 250° C.

The rigid package material is defined by its material composition. The majority of the material (50-80%) is comprised of the textile waste fibres. It is crucial that at least 25% of the textile waste fibres are synthetic. This combination ensures a specific set of mechanical and thermal properties in the material. The remaining 5-50% is the binder, which serves to hold the fibres together. The binder, with its specified melting point, contributes to the material's overall integrity and performance.

Optionally, the textile waste further comprises natural textile. In this regard, the method employs inclusion of the natural textiles such as cotton, wool, or flax in the textile waste. This inclusion brings diversity to the rigid package material, potentially influencing its texture, appearance, and other properties. The combination of the synthetic and the natural textiles enhances the versatility and potential applications of the rigid package material.

Optionally, the binder is selected from at least one of a Polyethylene (PE), recycled Polyethylene (rPE), a Polypropylene (rPP), a recycled Polypropylene (rPP). In this regard, the rigid package material, can have the binder sourced from recycled materials. Optionally, the binder is the recycled Polyethylene (rPE), the recycled Polypropylene (rPP) or recycled Polyethyleneterephtalate (rPET). The technical effect of selecting aforementioned binders is to align with eco-friendly practices, utilizing recycled materials in the production of the binder component of the rigid package material. Notably, the binder plays a crucial role in providing cohesion, strength, and stability to the composite material. By utilizing the post-consumer recycled polyethylene or the post-consumer recycled polypropylene, the method reduces the demand for virgin plastics, lessens the environmental impact associated with the production of new materials, and addresses concerns related to plastic waste accumulation. The resulting rigid package material reflects a commitment to circular and eco-conscious manufacturing practices.

The method aims to provide a durable yet thin and environmentally friendly rigid package material, offering a sustainable alternative to conventional packaging materials, aligning with the principles of the circular economy and contributing to waste reduction and carbon footprint reduction in e-commerce.

In addition to the environmental benefits, packaging made from recycled textiles offers various other advantages. The texture and flexibility of textile-based packaging allow for better protection of fragile goods, reducing the need for additional cushioning materials. Moreover, recycled textile packaging can be easily customized and branded, enabling businesses to maintain their unique identity while showcasing their commitment to sustainability.

EXPERIMENTAL PART

The rigid packaging material of textile waste was produced using different post-industrial and but not limited to post-consumer recycled fibres. Based on the experiments, the following has been observed:

- Experiment 1: 90% percent of post-consumer, but not limited to, recycled cotton/polyester mixed fibres was binded with 10% of the rPP or the rPE at the airlay process. During the thermomechanical processing the composition did not achieve the required rigidity and was over 4 mm thick.
- Experiment 2: 80% percent of post-consumer, but not limited to, recycled cotton/polyester mixed fibres was binded with 20% of the rPP or the rPE at the airlay process. During the thermomechanical processing the composition did not achieve the required rigidity and was over 3 mm thick.
- Experiment 3: 70% percent of post-consumer, but not limited to, recycled cotton/polyester mixed fibres was binded with 30% of the rPP or the rPE at the airlay process. During the thermomechanical processing the composition achieved the required rigidity and was under 3 mm thick.

The required rigidity and the thickness of the material is achieved when using at least 70% percent of post-consumer, but not limited to, recycled cotton/polyester mixed fibres.

DETAILED DESCRIPTION OF THE DRAWINGS

Referring to FIG. 1, illustrated is an illustration of a flowchart depicting steps of a method of producing a rigid package material from textile waste, in accordance with an embodiment of the present disclosure. At step 102, the textile waste is shredded mechanically into fibres having length from 0.2-90 mm, the textile waste comprising at least 25% of synthetic textile. At step 104, the fibres are blended with a binder having a melting point 90-250° C. At step 106, the blended fibres are arranged into a nonwoven web having thickness of 5-50 mm. At step 108, the nonwoven web is needle punched to form a nonwoven felt with an areal density of 300-5000 g/m2 and thickness of 5-40 mm. At step 110, the nonwoven felt is pressed thermomechanically at a pressure of 100-300 bars to obtain the rigid package material having thickness of 0.8-10 mm.

The aforementioned steps are only illustrative and other alternatives can also be provided where one or more steps are added, one or more steps are removed, or one or more steps are provided in a different sequence without departing from the scope of the claims herein.

Figure 2:
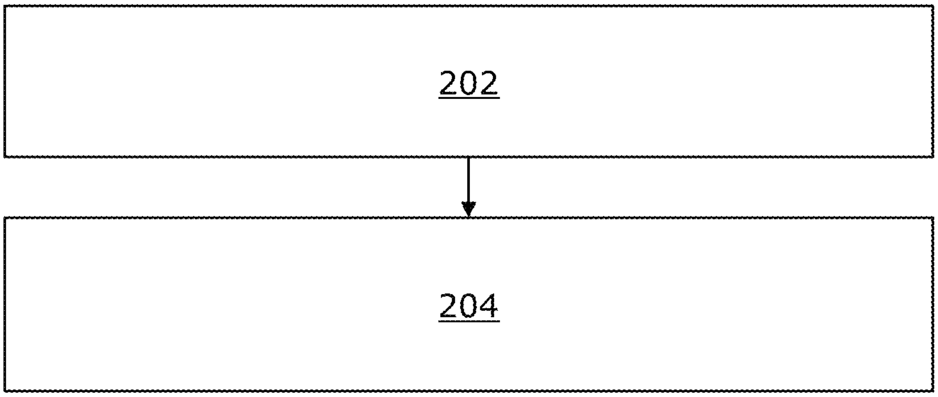
FIG. 2 is an illustration of a flowchart depicting steps of a method of producing a rigid box, in accordance with an embodiment of the present disclosure.

Referring to FIG. 2, illustrated is a flowchart depicting steps of a method of producing a rigid box, in accordance with an embodiment of the present disclosure. At step 202, the rigid package material is die-cut to obtain a layout of the rigid box, wherein the cut is made half-through the rigid package material. At step 204, the layout of the rigid package material is folded to obtain the rigid box.

The aforementioned steps are only illustrative and other alternatives can also be provided where one or more steps are added, one or more steps are removed, or one or more steps are provided in a different sequence without departing from the scope of the claims herein.

Figure 3:
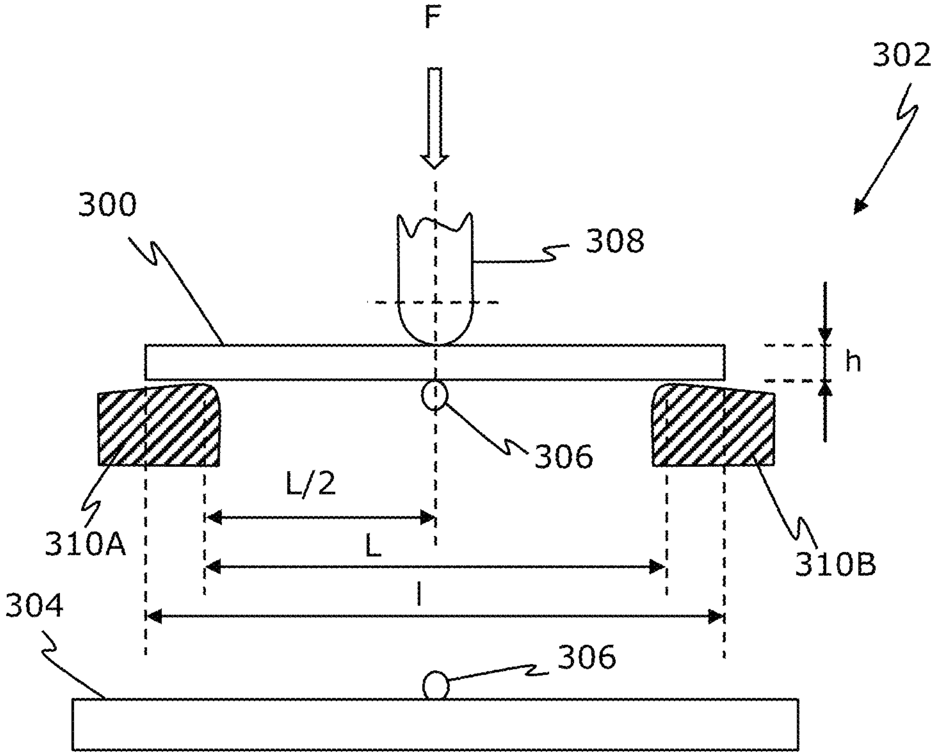
FIG. 3 is an illustration of a rigid package material being tested using an apparatus, in accordance with an embodiment of the present disclosure.

Referring to FIG. 3 is an illustration of a rigid package material 300 being tested using an apparatus 302, in accordance with an embodiment of the present disclosure. As shown, the apparatus 302 comprises a support base plate 304, a deflectometer 306, a loading edge 308 having a radius $R_1$, one or more supports such as 310A-B having a radius $R_2$ and a length L of span between the one or more supports such as 310A-B. Moreover, there is shown that the rigid package material 300 has a thickness h, a length l and a force F is applied thereupon. Apparatus Parameters:

Herein, the testing apparatus 302, follows specific parameters for accurate evaluation: the length (L): 25 mm, a pre-load crosshead speed: 1 mm/min, a pre-load crosshead load: 0.3 N, a crosshead load: 500 N, a crosshead speed: 20 mm/min, an endpoint: 10 mm of the rigid package material 300 bending depth. Furthermore, the rigid package material 300 is being tested resulting in the following values: a maximum compressive load in a range of 10.00-20.00 N, flexural modulus in a range of 0.6-0.7 MPa, extension at maximum compressive load in a range of 4 to −7 mm.

Figure 4A:
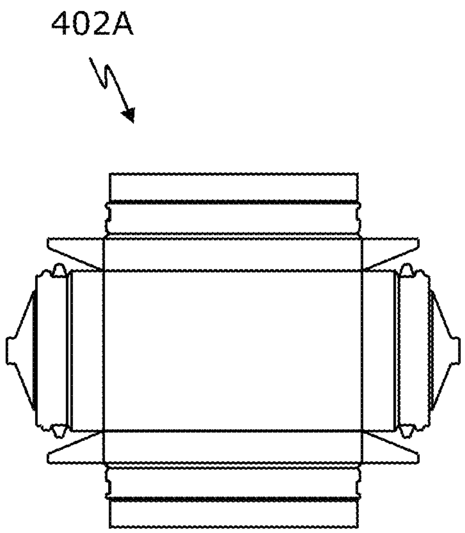
FIGS. 4A, 4B and 4C are illustrations of rigid boxes, in accordance with an embodiment of the present disclosure.
Figure 4B:
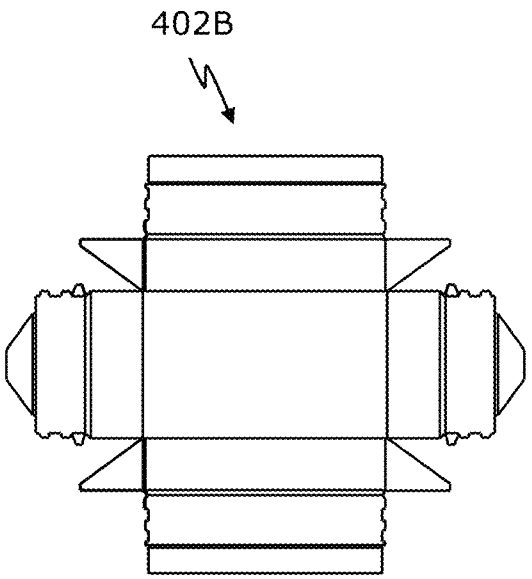
Figure 4C:
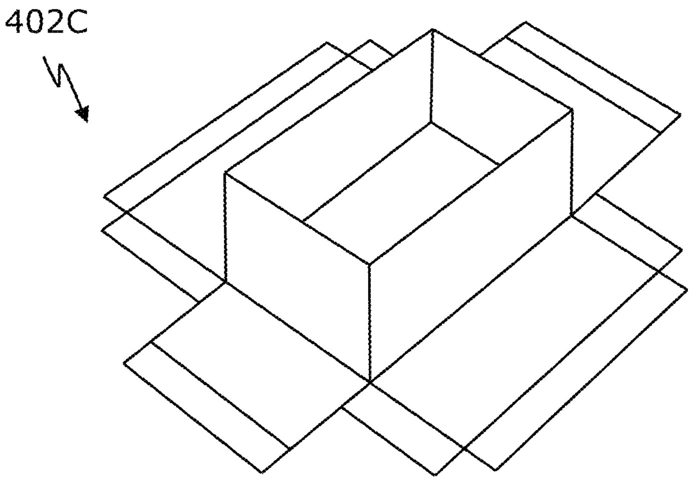

Referring to FIGS. 4A, 4B are illustrations of rigid boxes 402A-B, in accordance with an embodiment of the present disclosure. As shown in FIGS. 4A and 4B, a layout of the rigid boxes 402A and 402B. Herein the rigid boxes 402A and 402B are foldable premium boxes, which is assembled without an adhesive. It will be appreciated that the creasing lines are achieved by cutting halfway through the rigid packaging material, as opposed to making the creasing lines via rounded protrusions that are used in conventional cardboard die-cutting processes. As shown in FIG. 4C, a layout of a traditional premium box 402C from prior art, which can be only assembled with the adhesive.

FIGS. 4A, 4B are merely examples, which should not unduly limit the scope of the claims herein. A person skilled in the art will recognize many variations, alternatives, and modifications of embodiments of the present disclosure.

Figure 5A:
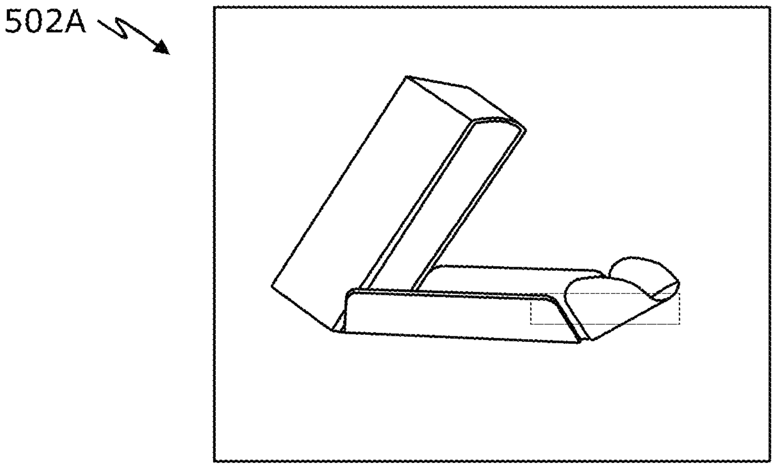
FIGS. 5A and 5B are illustrations of rigid boxes, in accordance with another embodiment of the present disclosure.
Figure 5B:
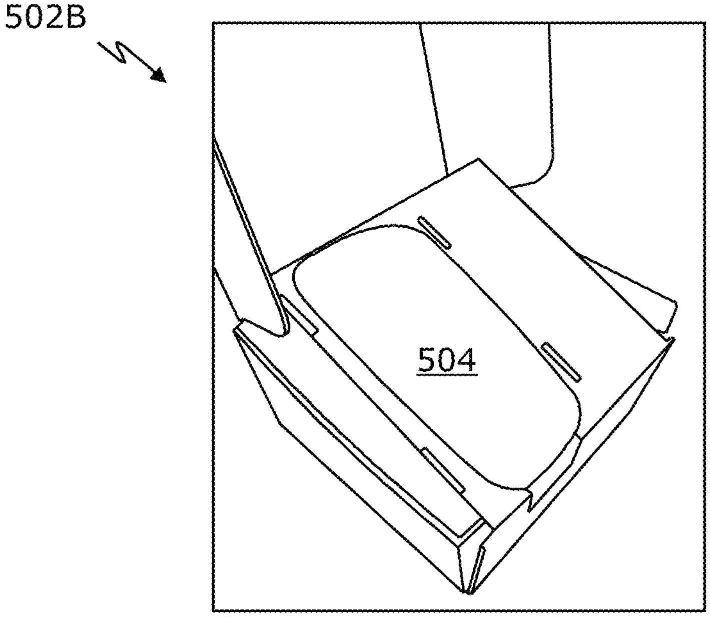

Referring to FIGS. 5A and 5B are illustrations of rigid boxes 502A-B, in accordance with another embodiment of the present disclosure. As shown, the rigid boxes 502A-B are produced using a rigid packaging material. The rigid packaging material is produced from the textile waste. The rigid boxes 502A-B are used as a product 504 packaging or a shipping (transportation) box. The rigid boxes 502A-B are folded into high-quality luxury packaging without using any adhesive.

FIGS. 5A and 5B are merely examples, which should not unduly limit the scope of the claims herein. A person skilled in the art will recognize many variations, alternatives, and modifications of embodiments of the present disclosure.

The invention claimed is:

1. A method of producing a rigid package material from textile waste, the method comprising:

mechanically shredding the textile waste into fibres having length from 0.2-8 mm, the textile waste comprising at least 40% of synthetic textile;

blending the fibres with a binder having a melting point 120-200° C., wherein the blended fibres comprise 60-70% of the shredded textile waste fibres and 40-30% of the binder;

arranging the blended fibres into a nonwoven web having thickness of 5-30 mm;

needle punching the nonwoven web to form a nonwoven felt with an areal density of 500-3000 g/m$^2$ and thickness of 5-20 mm; and pressing the nonwoven felt thermomechanically at a pressure of 100-250 bars to obtain the rigid package material having thickness of 1-3 mm, wherein the pressing is carried out at a temperature of 120-150 C.

2. The method according to claim 1, wherein the textile waste further comprises natural textile.

3. The method according to claim 1, wherein the binder is selected from at least one of: a post-consumer recycled Polyethylene (PCRPE), a post-consumer recycled Polypropylene (PCRPP), recycled Polyethyleneterephtalate (rPET).

4. The method according to claim 1, wherein arranging the blended fibres into the nonwoven web comprises at least one method selected from airlaying or carding.

5. The method according to claim 1, wherein the rigid package material is further processed with oil wax.

6. The method according to claim 1, wherein pressing is carried out using automated feeders, which load and unload the nonwoven felt between the heated metal plates during 60-180 seconds.

7. A method of producing a rigid box comprising die-cutting the rigid package material of claim 1 to obtain a layout of the rigid box, wherein the cut is made half-through the rigid package material; and folding the layout of the rigid package material to obtain the rigid box.

8. A rigid package material comprising 60-70% of textile waste fibres in the form of a nonwoven web obtained by needle punching, the textile waste fibres comprising at least 40% of synthetic fibres having a length of 0.2-8 mm, and 30-40% of a binder having a melting point 120-200° C., wherein the rigid package material has a thickness of 1-3 mm.

9. The rigid package material according to claim 8, wherein the textile waste further comprises natural textile.

10. The rigid package material according to claim 8, wherein the binder is selected from at least one of a post-consumer recycled Polyethylene (PCRPE), a post-consumer recycled Polypropylene (PCRPP), recycled Polyethyleneterephtalate (rPET).

* * * * *